(12) United States Patent
Yoshimura et al.

(10) Patent No.: US 7,473,486 B2
(45) Date of Patent: Jan. 6, 2009

(54) CATALYST-COATED MEMBRANE, MEMBRANE-ELECTRODE ASSEMBLY, AND POLYMER ELECTROLYTE FUEL CELL

(75) Inventors: Mikiko Yoshimura, Hirakata (JP); Yoshihiro Hori, Ikoma (JP); Yoichiro Tsuji, Katano (JP); Akihiko Yoshida, Hirakata (JP); Takeshi Yonamine, Mino (JP); Makoto Uchida, Hirakata (JP)

(73) Assignees: Panasonic Corporation, Osaka (JP); Asahi Glass Co., Ltd., Tokyo (JP)

( * ) Notice: Subject to any disclaimer, the term of this patent is extended or adjusted under 35 U.S.C. 154(b) by 731 days.

(21) Appl. No.: 11/042,322

(22) Filed: Jan. 26, 2005

(65) Prior Publication Data

US 2005/0214610 A1    Sep. 29, 2005

(30) Foreign Application Priority Data

Jan. 26, 2004   (JP)   ............... 2004-017713

(51) Int. Cl.
*H01M 4/86* (2006.01)
*H01M 4/96* (2006.01)

(52) U.S. Cl. ....................................... 429/42
(58) Field of Classification Search ........ None
See application file for complete search history.

(56) References Cited

U.S. PATENT DOCUMENTS 5,500,292 A    3/1996  Muranaka et al.
6,106,965 A    8/2000  Hirano et al.
7,097,932 B1 *  8/2006  Sakai et al. ............ 429/40

FOREIGN PATENT DOCUMENTS

| JP | 5-251086 A | 9/1993 |
| JP | 08-088008 | 4/1996 |
| JP | 9-265992 A | 10/1997 |
| JP | 9-265993 A | 10/1997 |
| JP | 10-092444 | 4/1998 |
| JP | 2002-298860 | 10/2002 |
| JP | 2003-056512 | 2/2003 |
| JP | 2003-303596 | 10/2003 |
| JP | 2004-047454 | 2/2004 |
| JP | 2004-192950 | 7/2004 |
| JP | 2004-349037 A | 12/2004 |
| JP | 2005-32528 A | 2/2005 |
| WO | WO 01/22514 | * 3/2001 |

* cited by examiner

*Primary Examiner*—Jonathan Crepeau
(74) *Attorney, Agent, or Firm*—McDermott Will & Emery LLP (57) ABSTRACT

An object of the present invention is to provide a catalyst-coated membrane suitable for achieving a polymer electrolyte fuel cell that sufficiently prevents a decrease in the initial characteristics and also exhibits sufficient cell performance for a long period of time and has excellent durability. In at least the cathode catalyst layer, the ratio ($W_P/W_{Cat-C}$) of the weight of the polymer electrolyte ($W_P$) to the weight of the catalyst-carrying carbon ($W_{Cat-C}$) is decreased from an innermost layer positioned closest to the polymer electrolyte membrane toward an outermost layer positioned farthest from the polymer electrolyte membrane. The ratio ($W_P/W_{Cat-C}$) in the innermost layer is 0.8 to 3.0, and the ratio ($W_P/W_{Cat-C}$) in the outermost layer is 0.2 to 0.6.

5 Claims, 3 Drawing Sheets

CATALYST-COATED MEMBRANE, MEMBRANE-ELECTRODE ASSEMBLY, AND POLYMER ELECTROLYTE FUEL CELL

BACKGROUND OF THE INVENTION

The present invention relates to a catalyst-coated membrane, a membrane-electrode assembly and a polymer electrolyte fuel cell comprising the same.

Since fuel cells (FC) have high power generation efficiency and are environmentally friendly, widespread use thereof as a distributed energy system is expected in the future. Particularly, polymer electrolyte fuel cells that use a polymer electrolyte having cations (hydrogen ions) are expected to be utilized in mobile units such as automobiles, distributed power generation systems and home cogeneration systems because they have high output density, they can operate at low temperatures and they can be made smaller.

Figure 4:
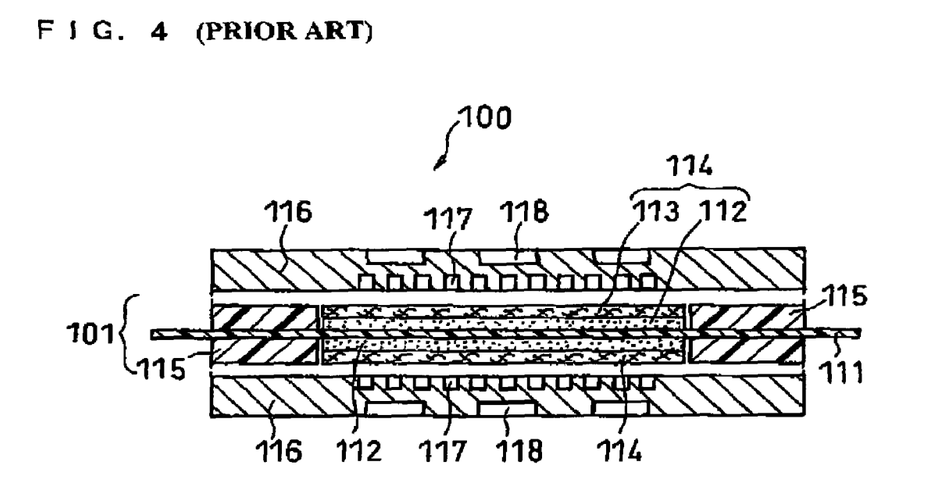
FIG. 4 is a schematic sectional view illustrating a basic structure of a unit cell designed to be mounted in a conventional polymer electrolyte fuel cell.
Figure 5:
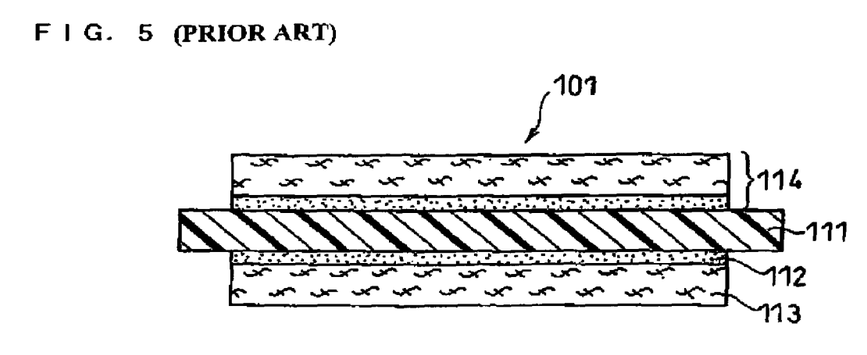
FIG. 5 is a schematic cross sectional view illustrating a basic structure of a membrane-electrode assembly designed to be mounted in the unit cell 100 shown in FIG. 4.
Figure 6:
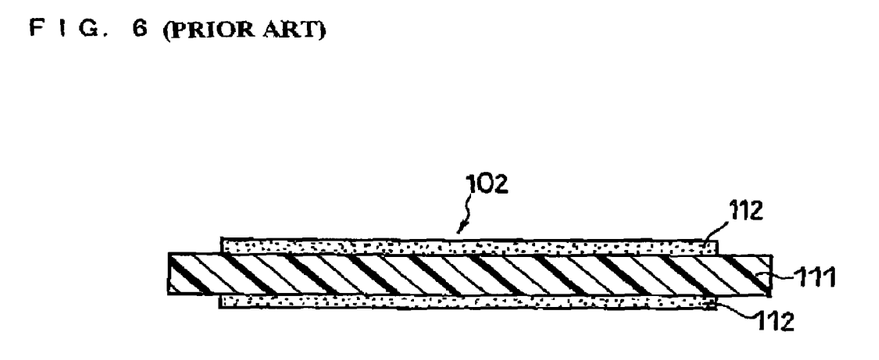
FIG. 6 is a schematic sectional view illustrating a catalyst-coated membrane constituting the membrane-electrode assembly 101 shown in FIG. 5.

Conventional polymer electrolyte fuel cells generate electricity and heat simultaneously by electrochemically reacting a fuel gas containing hydrogen and an oxidant gas containing oxygen such as air. FIG. 4 is a schematic sectional view illustrating a basic structure of a unit cell designed to be mounted in a conventional polymer electrolyte fuel cell. FIG. 5 is a schematic cross sectional view illustrating a basic structure of a membrane-electrode assembly (MEA) designed to be mounted in the unit cell 100 shown in FIG. 4. FIG. 6 is a schematic sectional view illustrating a catalyst-coated membrane (CCM) constituting the membrane-electrode assembly 101 shown in FIG. 5.

As shown in FIG. 6, in a catalyst-coated membrane 102, on each surface of a polymer electrolyte membrane 111 capable of selectively transporting hydrogen ions is formed a catalyst layer 112 composed of a hydrogen ion conductive polymer electrolyte and a catalyst-carrying carbon including a carbon powder and an electrode catalyst (e.g. platinum metal catalyst) carried on the carbon powder. As the polymer electrolyte membrane 111, polymer electrolyte membranes made of perfluorocarbonsulfonic acid such as Nafion (trade name) manufactured by E.I. Du Pont de Nemours & Co. Inc., USA are now widely used.

As shown in FIG. 5, a membrane-electrode assembly 101 is composed of catalyst layers 112 and gas diffusion layers 113 formed on the outer surfaces of the catalyst layers 112. The gas diffusion layer 113 is made of, for example, carbon paper treated for water repellency and having gas permeability and electron conductivity. The combination of the catalyst layer 112 and the gas diffusion layer 113 forms an electrode 114 (anode or cathode). As shown in FIG. 4, a unit cell 100 is composed of the membrane-electrode assembly 101, gaskets 115 and a pair of separator plates 116. The gaskets 115 are placed on the outer periphery of the electrodes and sandwich the polymer electrolyte membrane so as to prevent the supplied fuel gas and the supplied oxidant gas from leaking out and to prevent them from mixing with each other. The gaskets 115 are usually integrated in advance with the electrodes and the polymer electrolyte membrane. In some cases, the combination of the polymer electrolyte membrane 111, a pair of electrodes 114 (each electrode comprising the catalyst layer 112 and the gas diffusion layer 113) and gaskets 115 is referred to as "membrane-electrode assembly".

On the outer surfaces of the membrane-electrode assembly 101 are placed a pair of separator plates 116 for mechanically fixing the membrane-electrode assembly 101. On the surface of the separator plate 116 in contact with the membrane-electrode assembly 101 are formed gas flow paths 117 for supplying a reaction gas (fuel gas or oxidant gas) to the electrode and removing a gas containing an electrode reaction product and unreacted reaction gas from the reaction site to the outside of the electrodes. Although the gas flow paths 117 may be formed independently of the separator plate 116, they are usually formed by providing grooves on the surface of the separator plate as shown in FIG. 4. On the other side of the separator plate 116 not in contact with the membrane-electrode assembly 101 is formed a cooling water flow path 118 by providing a groove by cutting.

As described above, a single unit cell constructed by fixing the membrane-electrode assembly 101 with the pair of separator plates 116 can produce an electromotive force of about 0.7 to 0.8 V at a practical current density of several tens to several hundreds $mA/cm^2$ when the fuel gas is supplied to the gas flow path of one of the separator plates and the oxidant gas is supplied to that of the other of the separator plates. Polymer electrolyte fuel cells, however, are usually required to produce a voltage of several to several hundreds volts when used as power sources. For this reason, in practice, the required number of unit cells are connected in series to give a stack for use.

In order to supply the reaction gas to the gas flow paths 117, there is required a manifold in which pipes for supplying the reaction gas are branched into a corresponding number of separator plates and the branched pipes are directly connected to the gas flow paths on the separator plates. Particularly, a manifold in which external pipes for supplying the reaction gas are directly connected to the separator plates is called "external manifold". There is another type of manifold called "internal manifold", which has a simpler structure. An internal manifold is composed of apertures formed in the separator plates having gas flow paths formed thereon. The inlet and outlet apertures are connected with the gas flow path. The reaction gas is supplied to the gas flow path directly from the aperture.

The gas-diffusion layer 113 has the following three functions: (1) to diffuse the reaction gas so as to uniformly supply the reaction gas from the gas flow path of the separator plate 116 formed on the outer surface of the gas diffusion layer 113 to the electrode catalyst in the catalyst layer 112; (2) to rapidly carry away water produced by the reaction in the catalyst layer 112 to the gas flow path; and (3) to transfer the electrons required for the reaction or the produced electrons. As such, the gas diffusion layer 113 is required to have high reaction gas permeability, high water drainage capability and high electron conductivity.

Typically, in order to impart gas permeability to the gas diffusion layer 113, a conductive substrate having a porous structure made of carbon powder, pore-forming material, carbon paper or carbon cloth having a developed structure is usually used. In order to impart water permeability, a water repellent polymer as typified by fluorocarbon resin or the like is dispersed in the gas diffusion layer 113. In order to impart electron conductivity, the gas diffusion layer 113 is formed using an electron conductive material such as carbon fiber, metal fiber or carbon fine powder. On the surface of the gas diffusion layer 113 in contact with the catalyst layer 112 may be formed a water repellent carbon layer including a water repellent polymer and a carbon powder.

As for the catalyst layer 112, it has the following four functions: (1) to supply the reaction gas supplied from the gas diffusion layer 113 to the reaction site in the catalyst layer 112; (2) to transfer the hydrogen ions required for the reaction on the electrode catalyst or generated hydrogen ions; (3) to transfer the electrons required for the reaction or generated electrons; and (4) to accelerate the electrode reaction by its high catalytic performance and its large reaction area. As such, the catalyst layer 112 is required to have high reaction gas permeability, high hydrogen ion conductivity, high electron conductivity and high catalytic performance.

Typically, in order to impart gas permeability to the catalyst layer 112, a carbon fine powder or pore-forming material having a developed structure is used to form a catalyst layer having a porous structure and a gas channel. In order to impart hydrogen ion permeability (hydrogen ion conductivity), a polymer electrolyte is dispersed in the vicinity of the electrode catalyst in the catalyst layer 112 so as to form a hydrogen ion network. In order to impart electron conductivity, an electron conductive material such as carbon fine powder or carbon fiber is used as the carrier for the electrode catalyst to form an electron channel. In order to improve catalyst performance, a catalyst body including a carbon fine powder and a finely particulate electrode catalyst having a particle size of several nm carried on the carbon fine powder is densely dispersed in the catalyst layer 112.

For the commercialization of polymer electrolyte fuel cells, various attempts have been made to improve the performance of the membrane-electrode assembly 101 and the catalyst-coated membrane 102.

For example, in an attempt to suppress the degradation due to decomposition of a polymer electrolyte membrane, Japanese Laid-Open Patent Publications Nos. Hei 10-92444 (patent publication 1) and 2003-59512 (patent publication 2) propose techniques aimed at enhancing the mechanical strength and heat resistance of a polymer electrolyte membrane. Specifically, the above documents propose a method for physically reinforcing a polymer electrolyte membrane using a core material, and a method for chemically enhancing the durability of a polymer electrolyte membrane.

As for a catalyst layer, Japanese Laid-Open Patent Publications Nos. Hei 08-88008 (patent publication 3), 2003-303596 (patent publication 4) and 2004-47454 (patent publication 5) focus on the catalyst layer having a uniform monolayer structure from a polymer electrolyte membrane to a gas diffusion layer, and propose catalyst layers having novel structures from various points of view. Specifically, the above documents propose a method for changing the porosity of the catalyst layer in an attempt to prevent flooding due to product water and a method for changing the ratio of polymer electrolyte within a catalyst layer in an attempt to ensure proton conductivity in the near surface of the polymer electrolyte membrane.

Moreover, Japanese Laid-Open Patent Publication No. 2002-298860 (patent publication 6) proposes a technique to form a catalyst layer including a plurality of layers having different amounts of electrolyte in an attempt to obtain a catalyst layer having a good balance of proton conductivity and gas diffusibility. In an attempt to supply a reaction gas in a good condition regardless of the humidification conditions to improve the initial characteristics of the fuel cell, Japanese Laid-Open Patent Publication No. 2004-192950 (patent publication 7) proposes a technique to increase the porosity of a catalyst layer from the polymer electrolyte membrane side of the catalyst layer to the gas diffusion layer side of the same. Specifically, this patent publication investigates the amount of the polymer electrolyte relative to that of the catalyst in the catalyst layer.

The above-listed prior art publications, however, are essentially intended to improve the initial cell characteristics of the fuel cells and the mechanical strength and heat resistance of the polymer electrolyte membranes, and therefore no sufficient investigation has been made on a membrane-electrode assembly and a catalyst-coated membrane in the case of using the fuel cell for a long period of time, or on the improvement of durability and cycle life characteristics of the fuel cells.

To be more specific, even if the durability of a polymer electrolyte membrane is reinforced based on the techniques according to the above patent documents 1 and 2, the degradation of the membrane-electrolyte assembly as well as that of the catalyst-coated membrane cannot be sufficiently prevented when the fuel cell is operated for a long period of time. Accordingly, there still existed room for improvement in realizing a membrane-electrode assembly and a catalyst-coated membrane which have long service life and high efficiency.

The above patent documents 3 to 7 are silent on the technique to design a catalyst layer from the standpoint of enhancing the durability of a membrane-electrode assembly and a catalyst-coated membrane. Thus, there still existed room for improvement in realizing a membrane-electrode assembly and a catalyst-coated membrane which have long service life and high efficiency.

In short, the fuel cells according to the patent documents 1 to 7 still had room for improvement in terms of durability and cycle life characteristics.

In view of the above, an object of the present invention is to provide a catalyst-coated membrane and a membrane-electrode assembly which are capable of suppressing the degradation of a polymer electrolyte membrane for a long period of time even when the fuel cell is repeatedly operated and stopped and suitable for easily and surely achieving a polymer electrolyte fuel cell capable of sufficiently preventing the decrease in the initial characteristics and having excellent durability. Another object of the present invention is to provide a polymer electrolyte fuel cell, using the catalyst-coated membrane and the membrane-electrode assembly of the present invention, which can sufficiently prevent the decrease in the initial characteristics, exhibit sufficient cell performance for a long period of time and has excellent durability.

BRIEF SUMMARY OF THE INVENTION

In order to achieve the above objects, the present inventors conducted extensive studies on the possibility that the anode catalyst layer and the cathode catalyst layer closely attached to the polymer electrolyte membrane may greatly affect the durability of the polymer electrolyte membrane, and they successfully improved the durability of the catalyst-coated membrane and the membrane-electrode assembly by designing a catalyst layer having the following structure. Thus, the present invention has been accomplished.

Specifically, the present invention provides a catalyst-coated membrane comprising a hydrogen ion conductive polymer electrolyte membrane, a cathode catalyst layer and an anode catalyst layer sandwiching the polymer electrolyte membrane, the cathode catalyst layer and the anode catalyst layer each comprising: a catalyst-carrying carbon comprising a carbon powder and an electrode catalyst carried on the carbon powder; and a hydrogen ion conductive polymer electrolyte attached to the catalyst-carrying carbon, wherein at least the cathode catalyst layer comprises at least two layers, the ratio (WP/WCat-C) of the weight of the polymer electrolyte (WP) to the weight of the catalyst-carrying carbon (WCat-C) is decreased from an innermost layer positioned closest to the polymer electrolyte membrane toward an outermost layer positioned farthest from the polymer electrolyte membrane in the cathode catalyst layer, and the ratio (WP/WCat-C) in the innermost layer is 0.8 to 3.0 and the ratio (WP/WCat-C) in the outermost layer is 0.2 to 0.6, the ratio ($W_{Cat\text{-}innermost}/W_{Cat\text{-}total}$) of the weight of said electrode catalyst contained in said innermost layer ($W_{Cat\text{-}innermost}$) to the weight of said electrode catalyst contained in said entire cathode catalyst layer ($W_{Cat\text{-}total}$) is 1/10 to 1/3.

In the catalyst-coated membrane of the present invention, the ratio of the materials constituting the catalyst layer, namely, the ratio ($W_P/W_{Cat\text{-}C}$) of the weight of the polymer electrolyte ($W_P$) to the weight of the catalyst-carrying carbon ($W_{Cat\text{-}C}$) is changed. More specifically, the ratio ($W_P/W_{Cat\text{-}C}$) is changed such that the ratio ($W_P/W_{Cat\text{-}C}$) is decreased from the innermost layer positioned closest to the polymer electrolyte membrane toward the outermost layer positioned farthest from the polymer electrolyte membrane. In other words, the catalyst layer is formed such that the ratio ($W_P/W_{Cat\text{-}C}$) in the innermost layer of the catalyst layer positioned closest to the polymer electrolyte membrane becomes the greatest and that the ratio ($W_P/W_{Cat\text{-}C}$) is decreased toward the outermost layer of the catalyst layer positioned farthest from the polymer electrolyte membrane.

In the catalyst-coated membrane of the present invention, at least the cathode catalyst layer is formed to have the above structure, whereby it is possible to construct a catalyst-coated membrane which is capable of suppressing the degradation of the polymer electrolyte membrane for a long period of time even when the polymer electrolyte fuel cell is repeatedly operated and stopped and suitable for easily and surely achieving a polymer electrolyte fuel cell capable of sufficiently preventing the decrease in the initial characteristics and having excellent durability.

Although the exact mechanism for the above-described effects of the present invention created by providing at least the cathode catalyst layer with the above-described structure is not completely understood, the present inventors explain the mechanism as follows.

It has been reported that the degradation of the membrane-electrode assembly or the catalyst-coated membrane proceeds mainly in the polymer electrolyte membrane. Specifically, the electrode reaction in the fuel cell proceeds according to the formula (1) given below. The degradation of the polymer electrolyte membrane is presumably due to hydroxyl radicals derived from hydrogen peroxide produced by the side reaction of oxygen reduction as shown by the formula (2) below. During the degradation due to decomposition of the polymer electrolyte membrane, fluorine, which is a constituent element of the polymer electrolyte membrane, is released outside the fuel cell in the form of an ion. As such, it is possible to evaluate the durability by measuring the amount of fluoride ions released and quantifying the progress of the degradation due to decomposition of the membrane-electrode assembly or the catalyst-coated membrane (see Wen Liu et al., J. New Mater. Electrochem. Syst., 4 (2001) 227, for example).

$$4H^+ + O_2 + 4e^- \rightarrow 2H_2O \quad (1)$$

$$2H^+ + O_2 + 2e^- \rightarrow H_2O_2 \quad (2)$$

The present inventors believe that, by increasing the ratio ($W_P/W_{Cat\text{-}C}$) in the innermost layer of the catalyst layer to be in contact with the polymer electrolyte membrane, it is possible to improve the hydrogen ion conductivity at the interface between the polymer electrolyte membrane and the catalyst layer, preventing the generation of active oxygen species (e.g. peroxides such as $H_2O_2$ shown in the above formula (2), and radicals containing oxygen (O) as a constituent element) which is the cause of the degradation.

More specifically, the present inventors believe that, when the ratio ($W_P/W_{Cat\text{-}C}$) is decreased from the innermost layer toward the outermost layer, the innermost layer close to the polymer electrolyte membrane contains more polymer electrolyte, allowing the reaction represented by the formula (1) to proceed prior to the reaction represented by the formula (2), thereby reducing the amount of peroxides such as $H_2O_2$ (i.e. active oxygen species) generated at the area close to the polymer electrolyte membrane.

When the ratio ($W_P/W_{Cat\text{-}C}$) in the outermost layer is as great as that in the innermost layer, the porosity in the innermost layer and that in the outermost layer will be low, which makes it difficult to effectively remove the product water, eventually causing so-called "flooding phenomenon" that induces a variation and a decrease in the output voltage. As can be understood from the foregoing, the layer structure of the catalyst layer in which the ratio ($W_P/W_{Cat\text{-}C}$) is decreased from the innermost layer toward the outermost layer results in a catalyst-coated membrane that can achieve excellent life characteristics and excellent anti-flooding characteristics, or high durability in short, as well as long service life and high efficiency.

The expression "the ratio ($W_P/W_{Cat\text{-}C}$) of the weight of the polymer electrolyte ($W_P$) to the weight of the catalyst-carrying carbon ($W_{Cat\text{-}C}$) is decreased from the innermost layer positioned closest to the polymer electrolyte membrane toward the outermost layer positioned farthest from the polymer electrolyte membrane in the cathode catalyst layer" used herein means, on the assumption that the catalyst layer comprises at least two layers (i.e. a plurality of layers), the state in which the ratio ($W_P/W_{Cat\text{-}C}$) in the outermost layer positioned at one end of the catalyst layer is smaller than the ratio ($W_P/W_{Cat\text{-}C}$) in the outermost layer positioned at the other end of the catalyst layer, and the ratio ($W_P/W_{Cat\text{-}C}$) of each layer in the catalyst layer is generally decreased as a whole from the innermost layer toward the outermost layer.

For example, the ratio ($W_P/W_{Cat\text{-}C}$) may be monotonously decreased from the innermost layer toward the outermost layer. When the catalyst layer is composed of three layers or more, any adjoining layers among the layers sandwiched between the innermost layer and the outermost layer may have the same ratio ($W_P/W_{Cat\text{-}C}$). Further, when the ratios ($W_P/W_{Cat\text{-}C}$) of any adjoining layers among the layers sandwiched between the innermost layer and the outermost layer are compared, the ratio ($W_P/W_{Cat\text{-}C}$) of the layer positioned at the outermost layer side may be greater than that of the layer positioned at the innermost layer side. However, considering the gas diffusibility, it is preferred that the ratio ($W_P/W_{Cat\text{-}C}$) be monotonously decreased from the innermost layer toward the outermost layer, or that the ratios ($W_P/W_{Cat\text{-}C}$) of any adjoining layers among the layers sandwiched between the innermost layer and the outermost layer be the same.

In the catalyst-coated membrane of the present invention, it is preferred that the innermost layer of the catalyst layer satisfy $0.8 \leq (W_P/W_{Cat\text{-}C}) \leq 3.0$, and the outermost layer of the catalyst layer satisfy $0.2 \leq (W_P/W_{Cat\text{-}C}) \leq 0.6$. When the ratio ($W_P/W_{Cat\text{-}C}$) in the innermost layer is less than 0.8, the hydrogen ion conductivity at the interface between the polymer electrolyte membrane and the catalyst layer will be low, making the effect of suppressing the degradation of the polymer electrolyte membrane insufficient. When the ratio ($W_P/W_{Cat\text{-}C}$) in the innermost layer exceeds 3.0, the gas diffusibility will be insufficient, causing flooding. Likewise, when the ratio ($W_P/W_{Cat\text{-}C}$) in the outermost layer is less than 0.2, the hydrogen ion conductivity will be insufficient, hampering the smooth progress of the main reaction at the cathode catalyst layer represented by the above formula (1) to cause a decrease in the output voltage. When the ratio ($W_P/W_{Cat\text{-}C}$) exceeds 0.6, on the other hand, the gas diffusibility will be inhibited to cause flooding, failing to provide stable cell output.

Since the active oxygen species which are the cause of the degradation of the polymer electrolyte (e.g. peroxides shown in the above formula (2) such as $H_2O_2$, and radicals containing oxygen (O) as a constituent element) are produced in the presence of oxygen, the degradation due to decomposition presumably proceeds more rapidly in the polymer electrolyte membrane because the polymer electrolyte membrane is closely attached to the cathode catalyst layer to which the fuel gas is supplied. Thus, it can be concluded that it is effective to employ the catalyst structure in which the ratio ($W_P/W_{Cat-C}$) is varied into the cathode catalyst layer.

The catalyst-coated membrane of the present invention can be used in a membrane-electrode assembly formed of a pair of gas diffusion layers and the catalyst-coated membrane disposed therebetween (a membrane-electrode assembly obtained by assembling the above catalyst-coated membrane and a pair of gas diffusion layers by, for example, hot pressing).

In other words, the present invention provides a membrane-electrode assembly characterized by comprising the above-described catalyst-coated membrane of the present invention, a cathode gas diffusion layer formed on the outer surface of the cathode catalyst layer and an anode gas diffusion layer formed on the outer surface of the anode catalyst layer.

Because the membrane-electrode assembly of the present invention comprises the catalyst-coated membrane described previously, the degradation due to decomposition of the polymer electrolyte membrane in the membrane-electrode assembly is suppressed, which sufficiently prevents the decrease in the initial characteristics for a long period of time even when the polymer electrolyte fuel cell is repeatedly operated and stopped, eventually realizing excellent life characteristics and excellent anti-flooding characteristics, or high durability in short, as well as long service life and high efficiency.

The present invention further provides a polymer electrolyte fuel cell characterized by comprising the above-described membrane-electrode assembly of the present invention.

Because the fuel cell system of the present invention comprises the membrane-electrode assembly described previously, the degradation due to decomposition of the polymer electrolyte membrane in the membrane-electrode assembly is suppressed, which sufficiently prevents the decrease in the initial characteristics for a long period of time even when the polymer electrolyte fuel cell is repeatedly operated and stopped, eventually realizing excellent life characteristics and excellent anti-flooding characteristics, or high durability in short, as well as long service life and high efficiency.

According to the present invention, it is possible to provide a catalyst-coated membrane and a membrane-electrode assembly containing the catalyst-coated membrane, which are capable of suppressing the degradation due to decomposition of the polymer electrolyte membrane for a long period of time even when the fuel cell is repeatedly operated and stopped, and suitable for easily and surely achieving a polymer electrolyte fuel cell capable of sufficiently preventing the decrease in the initial characteristics and having excellent durability. Further, with the use of the membrane-electrode assembly of the present invention, it is further possible to provide a polymer electrolyte fuel cell that can sufficiently prevent the decrease in the initial characteristics, exhibit sufficient and stable cell performance for a long period of time and has excellent durability.

DETAILED DESCRIPTION OF THE INVENTION

Preferred embodiments of the present invention will be described below with reference to the accompanying drawings. It is to be understood that the same reference numerals are given to the same or corresponding parts, and some redundant descriptions are omitted.

Figure 1:
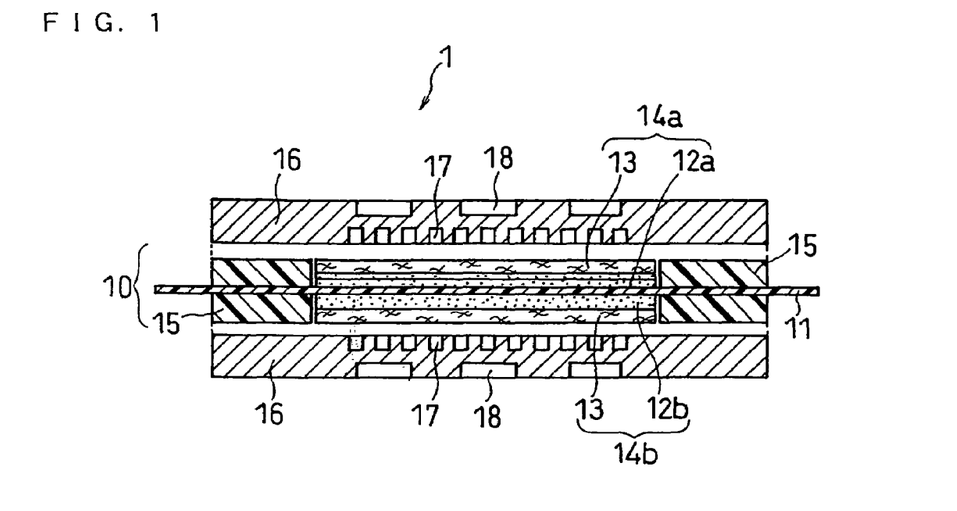
FIG. 1 is a schematic sectional view illustrating a basic structure of a unit cell designed to be mounted in a polymer electrolyte fuel cell according to one embodiment of the present invention.
Figure 2:
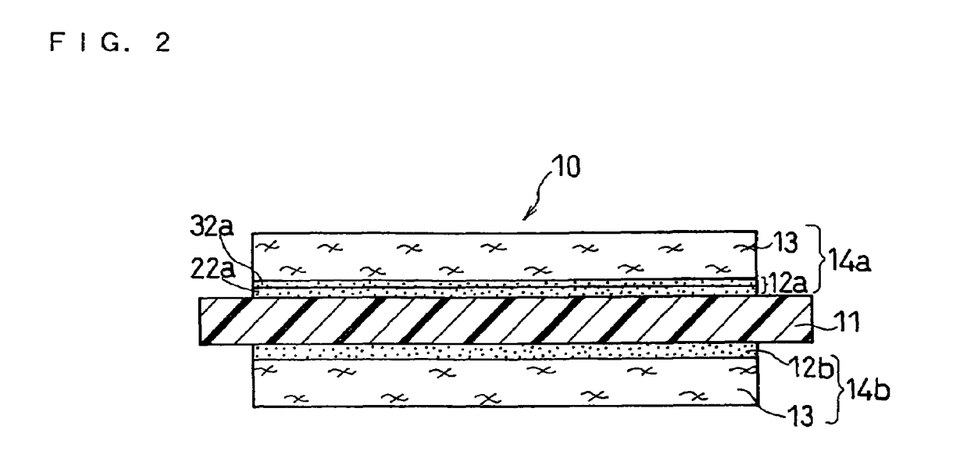
FIG. 2 is a schematic cross sectional view illustrating a basic structure of a membrane-electrode assembly designed to be mounted in the unit cell 1 shown in FIG. 1.
Figure 3:
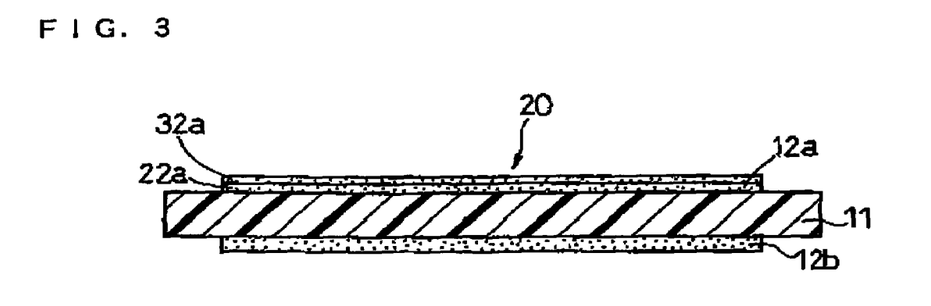
FIG. 3 is a schematic sectional view illustrating a catalyst-coated membrane constituting the membrane-electrode assembly 10 shown in FIG. 2.

FIG. 1 is a schematic sectional view illustrating a basic structure of a unit cell designed to be mounted in a polymer electrolyte fuel cell according to one embodiment of the present invention. FIG. 2 is a schematic cross sectional view illustrating a basic structure of a membrane-electrode assembly (MEA) designed to be mounted in the unit cell 1 shown in FIG. 1. FIG. 3 is a schematic sectional view illustrating a catalyst-coated membrane (CCM) constituting the membrane-electrode assembly 10 shown in FIG. 2.

As shown in FIG. 3, a catalyst-coated membrane 20 according to one embodiment of the present invention is constructed by forming a cathode catalyst layer 12a and an anode catalyst layer 12b on both surfaces of a polymer electrolyte membrane 11 capable of selectively transporting hydrogen ions. The cathode and anode catalyst layers 12a and 12b include a catalyst-carrying carbon and a hydrogen ion conductive polymer electrolyte. The catalyst-carrying carbon is prepared by allowing an electrode catalyst (e.g. platinum metal catalyst) to be carried on a carbon powder.

The polymer electrolyte membrane 11 is not specifically limited, and any polymer electrolyte membrane designed to be mounted on ordinary solid polymer electrolyte fuel cells can be used. For example, polymer electrolyte membranes made of perfluorocarbonsulfonic acid can be used: namely, Nafion (trade name) manufactured by E.I. Du Pont de Nemours & Co. Inc., USA, Aciplex (trade name) manufactured by Asahi Kasei Corporation and GSII manufactured by Japan Gore-Tex Inc.

A preferred example of the polymer electrolyte for constituting the polymer electrolyte membrane 11 is a polymer electrolyte having, as the cation exchange group, a sulfonic acid group, carboxylic acid group, phosphonic acid group or sulfone imide group. Particularly preferred is a polymer electrolyte having a sulfonic acid group, considering the hydrogen ion conductivity. A preferred example of the polymer electrolyte having a sulfonic acid group is one having an ion exchange capacity of 0.5 to 1.5 meq/g dry resin. The polymer electrolyte having an ion exchange capacity of less than 0.5 meq/g dry resin is not preferred because the resistance value of the obtained catalyst layer might increase during power generation. The polymer electrolyte having an ion exchange capacity exceeding 1.5 meq/g dry resin is not preferred either because the water content of the obtained catalyst layer might increase, making it likely for the catalyst layer to swell to clog the micropores of the catalyst layer. Further, a preferred ion exchange capacity is 0.8 to 1.2 meq/g dry resin.

As for the polymer electrolyte, preferred is a perfluorocarbon copolymer including, for example, a polymer unit based on a perfluorovinyl compound represented by $CF_2=CF-(OCF_2CFX)_m-O_p-(CF_2)_n-SO_3H$ (where m is an integer from 0 to 3, n is an integer from 1 to 12, p is 0 or 1, and X is a fluorine atom or trifluoromethyl group) and a polymer unit based on tetrafluoroethylene represented by $CF_2=CF_2$. The fluorocarbon polymer may contain, for example, an oxygen atom with an ether-bond.

Preferred EXAMPLES of the perfluorovinyl compound include compounds represented by the following formulas (3) to (5), where q is an integer from 1 to 8, r is an integer from 1 to 8, and t is an integer from 1 to 3.

$$CF_2=CFO(CF_2)_q-SO_3H \quad (3)$$

$$CF_2=CFOCF_2CF(CF_3)O(CF_2)_r-SO_3H \quad (4)$$

$$CF_2=CF(OCF_2CF(CF_3))_tO(CF_2)_2-SO_3 \quad (5)$$

The polymer electrolyte membrane 11 may include one or a plurality of kinds of polymer electrolytes, and also a reinforcing material (i.e. filler) in the polymer electrolyte membrane 11. The arrangement (e.g. the degree of density or regularity) of the reinforcing material in the polymer electrolyte membrane 11 is not specifically limited.

The material for constituting the reinforcing material is not specifically limited. EXAMPLES thereof include polytetrafluoroethylene, polyfluoroalkoxyethylene and polyphenylsulfide. The form of the reinforcing material is not specifically limited, either. The reinforcing material may be, for example, a porous reinforcing material, or fibrillated, fibrous or spherical reinforcing particles.

In the catalyst-coated membrane 20 according to one embodiment of the present invention, as having been described earlier, the cathode catalyst layer 12a and the anode catalyst layer 12b are made of a catalyst-carrying carbon including a carbon powder and an electrode catalyst carried on the carbon powder, and a hydrogen ion conductive polymer electrolyte attached to the catalyst-carrying carbon. In at least the cathode catalyst layer 12a, the ratio ($W_P/W_{Cat-C}$) of the weight of the polymer electrolyte ($W_P$) to the weight of the catalyst-carrying carbon ($W_{Cat-C}$) is decreased from the innermost layer 22a (first layer) positioned closest to the polymer electrolyte membrane 11 toward the outermost layer 32a (second layer) positioned farthest from the polymer electrolyte membrane 11. The ratio ($W_P/W_{Cat-C}$) in the innermost layer 22a is 0.8 to 3.0 and the ratio ($W_P/W_{Cat-C}$) in the outermost layer 32a is 0.2 to 0.6.

In one embodiment of the present invention, the ratio ($W_{Cat-innermost}/W_{Cat-total}$) of the weight of the electrode catalyst contained in the innermost layer 22a ($W_{Cat-innermost}$) to the weight of the electrode catalyst contained in the entire cathode catalyst layer 12a ($W_{Cat-total}$) is 1/10 to 1/3. When the ratio ($W_{Cat-innermost}/W_{Cat-total}$) is 1/10 or more, the innermost layer 22a will not be too thin, and therefore sufficient durability can be obtained. When the ratio ($W_{Cat-innermost}/W_{Cat-total}$) is 1/3 or less, the innermost layer 22a will not be too thick, and therefore the sufficient gas diffusibility can be obtained, resulting in offering stable cell output.

In the cathode catalyst layer 12a and the anode catalyst layer 12b according to one embodiment of the present invention, the polymer electrolyte does not necessarily cover the whole catalyst-carrying carbon particle, as long as the polymer electrolyte is partially attached to the surface of the catalyst-carrying carbon particle, in other words, the polymer electrolyte covers at least a part of the catalyst-carrying carbon particle. It is obviously needless to state that the polymer electrolyte can cover the whole surface of the catalyst-carrying carbon particle.

A preferred carbon powder (conductive carbon particle) serving as the carrier in the cathode catalyst layer 12a and the anode catalyst layer 13a is a conductive carbon material having developed micropores. Namely, carbon black, activated carbon, carbon fiber and carbon tube can be used. Examples of the carbon black include channel black, furnace black, thermal black and acetylene black. The activated carbon can be produced by subjecting a material containing various carbon atoms to carbonization and activation.

The carbon powder preferably has a specific surface area of 50 to 1500 $m^2/g$. The use of the carbon powder having a specific surface area of not less than 50 $m^2/g$ is preferred because it makes it easy to improve the electrode catalyst-carrying ratio, and it does not decrease the output characteristics of the cathode catalyst layer 12a and the anode catalyst layer 12b. The use of the carbon powder having a specific surface area of not greater than 1500 $m^2/g$ is also preferred because the micropores will not be too fine, the covering of the carbon powder by the polymer electrolyte becomes easy, and the output characteristics of the cathode catalyst layer 12a and the anode catalyst layer 12b will not decrease. Particularly preferred is a specific surface area of 200 to 900 $m^2/g$.

As the electrode catalyst that can be used for the cathode catalyst layer 12a and the anode catalyst layer 12b, platinum or a platinum alloy is preferred for use. The platinum alloy is preferably an alloy consisting of platinum and at least one metal selected from the group consisting of platinum metals other than platinum (ruthenium, rhodium, palladium, osmium and iridium), iron, titanium, gold, silver, chromium, manganese, molybdenum, tungsten, aluminum, silicon, rhenium, zinc and tin. The platinum alloy may contain an intermetallic compound consisting of platinum and the above metal(s).

Alternatively, an electrode catalyst mixture consisting of an electrode catalyst made of platinum and an electrode catalyst made of the platinum alloy may be used. The electrode catalyst for the cathode catalyst layer 12a and that for the anode catalyst layer 12b may be the same or different.

The primary particles of the electrode catalyst preferably have a particle size of 1 to 20 nm in order to make the cathode catalyst layer 12a and the anode catalyst layer 12b highly active. Particularly preferred is 2 to 10 nm because the particle size within that range will provide a large specific surface area to increase the reactivity.

The catalyst-carrying ratio of the catalyst-carrying carbon (i.e. the weight ratio of the electrode catalyst carried to the entire catalyst-carrying carbon) is preferably 20 to 80 wt %. Particularly preferred is 40 to 60 wt %. High cell output can be obtained when the catalyst-carrying ratio falls within that range. When the catalyst-carrying ratio is not less than 20 wt %, sufficient cell output is further ensured. When the catalyst-carrying ratio is not greater than 80 wt %, the electrode catalyst particles will be better dispersed on the carbon powder, increasing the effective catalytic area.

The ion conductive polymer electrolyte to be attached to the catalyst-carrying carbon contained in the cathode catalyst layer 12a and the anode catalyst layer 12b may be the same polymer electrolyte as used for consisting the polymer electrolyte membrane 11. The polymer electrolyte for the cathode catalyst layer 12a, that of the anode catalyst layer 12b and that for the polymer electrolyte membrane 11 may be the same or different. For example, commercially available polymer electrolytes can be used such as Nafion (trade name) manufactured by E.I. Du Pont de Nemours & Co. Inc., USA, Flemion (trade name) manufactured by Asahi Glass Co., Ltd and Aciplex (trade name) manufactured by Asahi Kasei Corporation.

As shown in FIG. 2, in the membrane-electrode assembly 10 according to one embodiment of the present invention, gas diffusion layers 13 having gas permeability and electron conductivity, for example, using carbon paper treated for water repellency, are formed on the outer surface of the cathode catalyst layer 12a and that of the anode catalyst layer 12b, respectively. The cathode catalyst layer 12a and the gas diffusion layer 13 are combined to form a cathode 14a. Likewise, the anode catalyst layer 12b and another gas diffusion layer 13 are combined to form an anode 14b.

As the gas diffusion layer 13, a conductive substrate having a porous structure can be used to impart gas permeability. The conductive substrate may be made of carbon fine powder, pore-forming material, carbon paper or carbon cloth having a developed structure. In order to impart water permeability, a water repellent polymer as typified by fluorocarbon resin may be dispersed in the gas diffusion layer 13. In order to impart electron conductivity, the gas diffusion layer 13 may be formed using an electron conductive material such as carbon fiber, metal fiber or carbon fine powder. Further, a water repellent carbon layer including a water repellent polymer and a carbon powder may be formed on the surface of the gas diffusion layer 13 to be in contact with the cathode catalyst layer 12a or the anode catalyst layer 12b. The gas diffusion layer of the cathode and that of the anode may be the same or different.

As shown in FIG. 1, the unit cell 1, which is the basic unit of the polymer electrolyte fuel cell according to one embodiment of the present invention, includes the membrane-electrode assembly 10, gaskets 15 and a pair of separator plates 16. The gaskets 15 are placed on the outer periphery of the cathode 14a and that of the anode 14b and sandwich the polymer electrolyte membrane 11 so as to prevent the supplied fuel gas and the supplied oxidant gas from leaking out and to prevent them from mixing with each other. The gaskets 15 are usually integrated in advance with the cathode 14a and the anode 14b and the polymer electrolyte membrane 11. The combination thereof is sometimes referred to as membrane-electrode assembly 10.

On the outer surfaces of the membrane-electrode assembly 10 are placed a pair of separator plates 16 for mechanically fixing the membrane-electrode assembly 10. On the surface of the separator plate 16 in contact with the membrane-electrode assembly 10 are formed gas flow paths 17 for supplying the oxidant gas to the cathode 14a and the fuel gas to the anode 14b and for removing a gas containing an electrode reaction product and unreacted reaction gas from the reaction site to the outside of the cathode 14a and the anode 14b. The gas flow paths 17 can be formed independently of the separator plate 16. In FIG. 1, however, the gas flow paths 17 are formed on the surface of the separator plate 16 by providing grooves. On the other side of the separator plate 16 is formed a cooling water flow path 18 by providing a groove by cutting.

As described above, a single unit cell constructed by fixing the membrane-electrode assembly 10 with the pair of separator plates 16 can produce an electromotive force of about 0.7 to 0.8 V at a practical current density of several tens to several hundreds mA/cm$^2$ when the fuel gas is supplied to the gas flow path 17 of one of the separator plates 16 and the oxidant gas is supplied to that of the other of the separator plates 16. In practice, a polymer electrolyte fuel cell is required to produce a voltage of several to several hundreds volts when used as power sources. Accordingly, the required number of unit cells 1 should be connected in series to give a stack (not shown in the drawings) for use.

In order to supply the reaction gas to the gas flow path 17, a manifold in which pipes for supplying the reaction gas are branched into a corresponding number of separator plates 16 and the branched pipes are directly connected to the gas flow paths on the separator plates is required. In the present invention, either an external manifold or internal manifold can be used.

The cathode catalyst layer 12a (i.e. innermost layer 22a and outermost layer 32a) and the anode catalyst layer 12b according to one embodiment of the present invention can be formed using a plurality of inks for forming the catalyst layer with compositions adjusted to realize the catalyst layer structure of the present invention. The dispersion medium used for preparing the ink for forming the catalyst layer is preferably a liquid containing alcohol and capable of dissolving or dispersing the polymer electrolyte (including the condition in which a part of the polymer electrolyte is dissolved and the rest is not dissolved but dispersed). The dispersion medium preferably contains at least one selected from the group consisting of water, methanol, ethanol, propanol, n-butyl alcohol, isobutyl alcohol, sec-butyl alcohol and tert-butyl alcohol. The above listed water and alcohols may be used singly or in any combination of two or more. Particularly preferred is an alcohol having a straight chain containing one OH group in the molecule, which is ethanol, for example. The alcohol includes alcohols having an ether bond such as ethylene glycol monomethyl ether.

The composition of the ink for forming the catalyst layer can be appropriately adjusted according to the structure of the cathode catalyst layer 12a (innermost layer 22a or outermost layer 32a) or the anode catalyst layer 12b. The solid content is preferably 1 to 20 wt %. When the solid content is less than 0.1 wt %, repeated spraying or repeated application of the ink for forming the catalyst layer will be required to form a catalyst layer having a predetermined thickness, decreasing the productivity. When the solid content exceeds 20 wt %, the obtained mixture will have a high viscosity, making it likely to produce a nonuniform catalyst layer. Particularly preferred is a solid content of 1 to 10 wt %.

In the present invention, the ink for forming the catalyst layer (the ink for forming the cathode catalyst layer 12a, the ink for forming the anode catalyst layer 12b, the ink for forming the innermost layer 22a and the ink for forming the outermost layer 32a) can be prepared by any conventionally known method. Namely, there are a method involving the use of a stirrer such as homogenizer or homomixer, a method involving the use of high-speed rotation such as high-speed rotation jet type, and a method in which the a dispersion is extruded through a narrow opening with high pressure in a high-pressure emulsifier so as to apply shear force to the dispersion.

When the cathode catalyst layer 12 (i.e. innermost layer 22a and outermost layer 32a) and the anode catalyst layer 12b are formed using the ink for forming the catalyst layer of the present invention, either of the following methods can be used: direct application method in which the catalyst layer is formed directly on the polymer electrolyte membrane 11; and indirect application method in which the catalyst layer is formed indirectly on the polymer electrolyte membrane 11. Examples of the direct application method include screen printing, die coating, spraying and inkjetting. An example of the indirect application method is to form the catalyst layer 12 on a substrate made of polypropylene or polyethylene terephthalate, which is then thermally transferred onto the polymer electrolyte membrane 11 or an inner catalyst layer 12 formed in advance. When the membrane-electrode assembly 10 according to one embodiment of the present invention shown in FIG. 2 is formed, the cathode catalyst layer 12a and the anode catalyst layer 12b may be first formed on the gas diffusion layers 13, respectively, which are then attached to the polymer electrolyte membrane 11.

Particularly, when the cathode catalyst layer 12a including a plurality of layers such as the innermost layer 22a and the outermost layer 32a is formed, the ink for forming the innermost layer 22a and the ink for forming the outermost layer 32a may be first prepared, which are then sprayed from different nozzles (the application may be done continuously, for example). In the case of forming the cathode catalyst layer 12 including more than two layers, the inks for forming the layers may be first prepared, which are continuously sprayed from different nozzles. By the continuous spraying as described above, the ratio ($W_P/W_{Cat-C}$) of each layer can be changed stepwise with ease and without fail, enabling to easily realize the structure of the present invention without fail.

In one embodiment of the present invention, at least the cathode catalyst layer 12a among the cathode catalyst layer 12a and the anode catalyst layer 12b has the double layer structure in which two layers have different ratios ($W_P/W_{Cat-C}$). In this embodiment, the cathode catalyst layer 12a can be formed using the following methods: (I) direct application method, (II) the combination of direct application method and indirect application method, and (III) indirect application method.

In the case of direct application method (I), the first layer 22a (innermost layer) is first formed directly on the polymer electrolyte membrane 11, after which the second layer 32a (outermost layer) is formed directly on the first layer 22a to give a membrane-electrode assembly 20 of the present invention.

In the case of the combination of direct application method and indirect application method (II), the first layer 22a (innermost layer) is first formed directly on the polymer electrolyte membrane 11, after which the second layer 32a (outermost layer) is formed on a substrate (not shown in the drawings) or the gas diffusion layer 13a, which are then combined.

The second layer 32a formed on a substrate is transferred onto the first layer 22a formed on the polymer electrolyte membrane 11 to give a membrane-electrode assembly of the present invention. The second layer 32a formed on the gas diffusion layer 13 is attached directly onto the first layer 22a formed on the polymer electrolyte membrane 11 to give a membrane-electrode assembly 10 of the present invention.

In the case of indirect application method (III), the first layer 22a is formed on a first substrate and the second layer 32a is formed on a second substrate, after which the first layer 22a is transferred onto the polymer electrolyte membrane 11, and then the second layer 32a is transferred onto the first layer 22a formed on the polymer electrolyte membrane 11 to give a catalyst-coated membrane 20 of the present invention.

In the case of forming the first layer 22a on a first substrate and the second layer 32a on the gas diffusion layer 13, the first layer 22a is transferred onto the polymer electrolyte membrane 11, and the second layer 32a formed on the gas diffusion layer 13 is attached directly onto the first layer 22a formed on the polymer electrolyte membrane 11. Thereby, a membrane-electrode assembly 10 of the present invention can be obtained.

Alternatively, the first layer 22a may be thermally transferred onto the second layer 32a formed on the gas diffusion layer 13, after which the gas diffusion layer 13 having the second layer 32a and the first layer 22a formed thereon is attached directly onto the polymer electrolyte membrane 11 to give a membrane-electrode assembly 10 of the present invention.

The thermal transfer and the attachment can be done by conventionally known methods. The method for forming the cathode catalyst layer can be designed and changed appropriately as long as it is possible to realize at least the cathode catalyst layer 12a in which the ratio ($W_P/W_{Cat-C}$) of the weight of the polymer electrolyte ($W_P$) to the weight of the catalyst-carrying carbon ($W_{Cat-C}$) is decreased from the innermost layer 22a positioned closest to the polymer electrolyte membrane 11 toward the outermost layer 32a positioned farthest from the polymer electrolyte membrane 11, and the ratio ($W_P/W_{Cat-C}$) in the innermost layer 22a is 0.8 to 3.0, and the ratio ($W_P/W_{Cat-C}$) in the outermost layer 32a is 0.2 to 0.6, as described above.

Whether the above-described catalyst layer which is the principal feature of the present invention is used in the catalyst-coated membrane 20, the membrane-electrode assembly 10 or the polymer electrolyte fuel cell (unit cell 1) can be checked by the following method. For example, by observing the cross-section using a scanning electron microscope (SEM), the structure of the catalyst layer including layers having different ratios ($W_P/W_{Cat-C}$) can be easily checked because the catalyst layer whose ratio ($W_P/W_{Cat-C}$) is greater is observed to be brighter than the rest.

By observing the cross-section using an electron probe microanalyzer (EPMA), the quantification of the atoms in the catalyst layer such as platinum can be done. Furthermore, the use of a secondary ion mass spectrometer (SIMS), X-ray diffractometer (XRD), optical emission spectrometer (OES), energy dispersive X-ray fluorescence spectrometer (EDX), wavelength dispersive X-ray fluorescence spectrometer (XRF) or the like enables the quantitative analysis of the atoms (elements) constituting the catalyst layer and the measurement of the ratio ($W_P/W_{Cat-C}$) of each layer of the catalyst layer.

Although the embodiments of the present invention have been described in detail above, it should be understood that the scope of the present invention is not limited thereto.

For example, in the catalyst-coated membrane 20, the membrane-electrode assembly 10 and the polymer electrolyte fuel cell (unit cell 1) of the present invention, at least the cathode catalyst layer among the catalyst layers includes two layers or more, and the embodiment of the anode catalyst layer is not specifically limited. The anode catalyst layer may have the same structure as the cathode catalyst layer. Particularly preferred is the structure in which the anode catalyst layer includes one layer and the cathode catalyst layer comprises two layers. Considering the number of steps for producing the catalyst-coated membrane 20 and the membrane-electrode assembly 10 and the cost thereof, it is preferred that the cathode catalyst layer 12a include two layers of innermost layer 22a and outermost layer 32a like the embodiment of the present invention described previously.

In the foregoing description in which preferred embodiments of the polymer electrolyte fuel cell of the present invention have been set forth, the polymer electrolyte fuel cell including only one unit cell 1 has been discussed. However, the scope of the present invention is not limited thereto, and polymer electrolyte fuel cells having a stack including a plurality of unit cells 1 are also included in the scope of the present invention.

Moreover, in the above-described embodiments, the case in which the cooling water flow paths 18 are formed on the anode-side separator plate 16 and the cathode-side separator plate 16 respectively has been discussed. However, the cooling water flow path 18 may be formed on at least one of the separator plates. Particularly when a stack including a plurality of unit cells 1 is used in a polymer electrolyte fuel cell of the present invention, the cooling water flow path 18 may be formed on every two to three unit cells.

The present invention will be described in further detail below referring to EXAMPLEs and COMPARATIVE EXAMPLEs, but it is to be understood that the scope of the present invention is not limited thereto.

EXAMPLE 1

A catalyst-coated membrane of the present invention having the structure illustrated in FIG. 3 was first produced in this example.

Inks for forming the cathode catalyst layer were prepared by dispersing a catalyst-carrying carbon comprising carbon powders and platinum particles serving as the electrode catalyst carried on the carbon powders (TEC10E50E manufactured by Tanaka Kikinzoku Kogyo K.K containing 50 wt % of Pt) and a hydrogen ion conductive polymer electrolyte solution (Flemion manufactured by Asahi Glass Co., Ltd) in a mixed dispersion medium of ethanol and water at a weight ratio of 1:1.

Using the prepared inks for forming the cathode catalyst layer, a 60 mm×60 mm cathode catalyst layer having a double layer structure and containing platinum in a total amount of 0.6 mg/cm$^2$ was formed. The above ink for forming the catalyst layer was applied onto one surface of a 150 mm×150 mm polymer electrolyte membrane (GSII manufactured by Japan Gore-Tex Inc) by spraying to form a 60 mm×60 mm first layer (innermost layer) containing platinum in an amount of 0.12 mg/cm$^2$. In the preparation of the first layer, the amount of the polymer electrolyte solution used for the preparation of the ink for forming the cathode catalyst layer was adjusted such that the ratio ($W_P/W_{Cat-C}$) of the weight of the polymer electrolyte ($W_P$) to the weight of the catalyst-carrying carbon in the first layer ($W_{Cat-C}$) was 1.0.

The ink for forming the cathode catalyst layer was then applied onto the first layer to form a 60 mm×60 mm second layer (outermost layer) containing platinum in an amount of 0.48 mg/cm$^2$. In the preparation of the second layer, the amount of the polymer electrolyte solution used for the preparation of the ink for forming the cathode catalyst layer was adjusted such that the ratio ($W_P/W_{Cat-C}$) of the weight of the polymer electrolyte ($W_P$) to the weight of the catalyst-carrying carbon in the second layer ($W_{cat-c}$) was 0.4. Thereby, a cathode catalyst layer having a double layer structure was formed.

Subsequently, an ink for forming the anode catalyst layer was prepared by dispersing a catalyst-carrying carbon including carbon powders and platinum-ruthenium alloy particles (platinum:ruthenium=1:1.5) serving as the electrode catalyst formed on the carbon powders (TEC61E54 manufactured by Tanaka Kikinzoku Kogyo K.K containing 50 wt % of Pt—Ru alloy) and a hydrogen ion conductive polymer electrolyte solution (Flemion manufactured by Asahi Glass Co., Ltd.) in a mixed dispersion medium of ethanol and water at a weight ratio of 1:1.

The prepared ink for forming the anode catalyst layer was applied onto the other surface of the polymer electrolyte membrane, which was opposite to the surface thereof having the cathode catalyst layer formed thereon, by spraying to form a 60 mm×60 mm anode catalyst layer having a monolayer (one layer) structure and containing platinum in an amount of 0.35 mg/cm$^2$. In the preparation of the anode catalyst layer, the amount of the polymer electrolyte solution used for the preparation of the ink for forming the anode catalyst layer was adjusted such that the ratio ($W_P/W_{Cat-C}$) of the weight of the polymer electrolyte ($W_P$) to the weight of the catalyst-carrying carbon in the anode catalyst layer ($W_{Cat-c}$) was 0.4. Thereby, an anode catalyst layer was formed, and finally a catalyst-coated membrane was produced.

With the use of the thus-produced catalyst-coated membrane of the present invention, a membrane-electrode assembly of the present invention having the structure shown in FIG. 2 was produced.

In order to form a gas diffusion layer, a 16 mm×20 mm carbon cloth having a thickness of 270 μm (SK-1 manufactured by Mitsubishi Chemical Corporation) was impregnated with an aqueous dispersion containing fluorocarbon resin (ND-1 manufactured by Daikin Industries, Ltd.), which was then dried to impart water repellency to the carbon cloth (water-repellent treatment).

Subsequently, a water repellent carbon layer was formed on one entire surface of the carbon cloth treated for water repellency. Conductive carbon powders (DENKA BLACK (trade name) manufactured by Denki Kagaku Kogyo Kabushiki Kaisha) and an aqueous solution having polytetrafluoroethylene (PTFE) particles dispersed therein (D-1 manufactured by Daikin Industries, Ltd.) were mixed to give an ink for forming the water-repellent carbon layer. The prepared ink for forming the water repellent carbon layer was applied onto one surface of the carbon cloth treated for water repellency by doctor blade technique to form a water repellent carbon layer. The surface of the water repellent carbon layer was partly embedded in the carbon cloth.

The carbon cloth treated for water repellency and having the water repellent carbon layer formed thereon was baked at 350° C., a temperature higher than the melting point of PTFE, for 30 minutes. Finally, the center portion of the carbon cloth was cut out using a mold to give a 60.5 mm×60.5 mm gas diffusion layer.

Subsequently, the catalyst-coated membrane was sandwiched between two gas diffusion layers just obtained such that the center portions of the water repellent carbon layers of the gas diffusion layers were attached to the cathode catalyst layer and the anode catalyst layer, respectively. The whole was then thermally bonded by a hot press at 10 kgf/cm$^2$ at 120° C. for 30 minutes to give a membrane-electrode assembly of the present invention.

With the use of the membrane-electrode assembly of the present invention produced above, a polymer electrolyte fuel cell (unit cell 1) of the present invention having the structure shown in FIG. 1 was constructed. The membrane-electrode assembly produced above was sandwiched between a separator plate having the gas flow path for supplying the fuel gas and the cooling water flow path and another separator plate having the gas flow path for supplying the oxidant gas and the cooling water flow path. Gaskets made of fluorine rubber were placed on the outer periphery of the cathode and that of the anode between the above separators, whereby a unit cell (polymer electrolyte fuel cell of the present invention) having an effective electrode (anode or cathode) area of 36 cm$^2$ was constructed.

COMPRATATIVE EXAMPLE 1

A catalyst-coated membrane, a membrane-electrode assembly and a unit cell were produced in the same manner as in EXAMPLE 1 except that a cathode catalyst layer having a ratio ($W_P/W_{Cat-C}$) of 0.4 and a monolayer structure was formed.

EXAMPLE 2

A catalyst-coated membrane, a membrane-electrode assembly and a unit cell were produced in the same manner as in EXAMPLE 1 except that a cathode catalyst layer including the following three layers (three-layer structure) was formed: a first layer (innermost layer) having a ratio ($W_P/W_{Cat-C}$) of 1.0 and containing platinum in an amount of 0.12 mg/cm$^2$ (1/5 of the total amount of the platinum contained; a second layer (intermediate layer) having a ratio ($W_P/W_{Cat-C}$) of 0.6 and containing platinum in an amount of 0.24 mg/cm$^2$ (2/5 of the total amount of the platinum contained); and a third layer (outermost layer) having a ratio ($W_P/W_{Cat-C}$) of 0.4 and containing platinum in an amount of 0.24 mg/cm$^2$ (2/5 of the total amount of the platinum contained).

COMPARATIVE EXAMPLE 2

A catalyst-coated membrane, a membrane-electrode assembly and a unit cell were produced in the same manner as in EXAMPLE 1 except that a cathode catalyst layer having a monolayer structure and a ratio ($W_P/W_{Cat-C}$) of 0.4 was formed, and that an anode catalyst layer including the following two layers (double layer structure) was formed: a first layer (innermost layer) having a ratio ($W_P/W_{Cat-C}$) of 1.0 and containing platinum in an amount of 0.12 mg/cm$^2$; and a second layer (outermost layer) having a ratio ($W_P/W_{Cat-C}$) of 0.4 and containing platinum in an amount of 0.48 cm/cm$^2$.

EXAMPLE 3

A catalyst-coated membrane, a membrane-electrode assembly and a unit cell were produced in the same manner as in EXAMPLE 1 except that the ratio ($W_P/W_{Cat-C}$) in the first layer (innermost layer) of the cathode catalyst layer was adjusted to 0.8.

EXAMPLE 4

A catalyst-coated membrane, a membrane-electrode assembly and a unit cell were produced in the same manner as in EXAMPLE 1 except that the ratio ($W_P/W_{Cat-C}$) in the first layer (innermost layer) of the cathode catalyst layer was adjusted to 1.5.

EXAMPLE 5

A catalyst-coated membrane, a membrane-electrode assembly and a unit cell were produced in the same manner as in EXAMPLE 1 except that the ratio ($W_P/W_{Cat-C}$) in the first layer (innermost layer) of the cathode catalyst layer was adjusted to 3.0.

COMPARATIVE EXAMPLE 3

A catalyst-coated membrane, a membrane-electrode assembly and a unit cell were produced in the same manner as in EXAMPLE 1 except that the ratio ($W_P/W_{Cat-C}$) in the first layer (innermost layer) of the cathode catalyst layer was adjusted to 0.6.

COMPARATIVE EXAMPLE 4

A catalyst-coated membrane, a membrane-electrode assembly and a unit cell were produced in the same manner as in EXAMPLE 1 except that the ratio ($W_P/W_{Cat-C}$) in the first layer (innermost layer) of the cathode catalyst layer was adjusted to 3.5.

EXAMPLE 6

A catalyst-coated membrane, a membrane-electrode assembly and a unit cell were produced in the same manner as in EXAMPLE 1 except that the ratio ($W_P/W_{Cat-C}$) in the second layer (outermost layer) of the cathode catalyst layer was adjusted to 0.2.

EXAMPLE 7

A catalyst-coated membrane, a membrane-electrode assembly and a unit cell were produced in the same manner as in EXAMPLE 1 except that the ratio ($W_P/W_{Cat-C}$) in the second layer (outermost layer) of the cathode catalyst layer was adjusted to 0.3.

EXAMPLE 8

A catalyst-coated membrane, a membrane-electrode assembly and a unit cell were produced in the same manner as in EXAMPLE 1 except that the ratio ($W_P/W_{Cat-C}$) in the second layer (outermost layer) of the cathode catalyst layer was adjusted to 0.5.

EXAMPLE 9

A catalyst-coated membrane, a membrane-electrode assembly and a unit cell were produced in the same manner as in EXAMPLE 1 except that the ratio ($W_P/W_{Cat-C}$) in the second layer (outermost layer) of the cathode catalyst layer was adjusted to 0.6.

COMPARATIVE EXAMPLE 5

A catalyst-coated membrane, a membrane-electrode assembly and a unit cell were produced in the same manner as in EXAMPLE 1 except that the ratio ($W_P/W_{Cat-C}$) in the second layer (outermost layer) of the cathode catalyst layer was adjusted to 0.15.

COMPARATIVE EXAMPLE 6

A catalyst-coated membrane, a membrane-electrode assembly and a unit cell were produced in the same manner as in EXAMPLE 1 except that the ratio ($W_P/W_{Cat-C}$) in the second layer (outermost layer) of the cathode catalyst layer was adjusted to 0.7.

EXAMPLE 10

A catalyst-coated membrane, a membrane-electrode assembly and a unit cell were produced in the same manner as in EXAMPLE 1 except that the amount of the platinum carried in the first layer (innermost layer) of the cathode catalyst layer was adjusted to 0.06 mg/cm$^2$ (1/10 of the total amount of the platinum contained), and that the amount of the platinum carried in the second layer (outermost layer) of the same was adjusted to 0.54 mg/cm² (9/10 of the total amount of the platinum contained).

EXAMPLE 11

A catalyst-coated membrane, a membrane-electrode assembly and a unit cell were produced in the same manner as in EXAMPLE 1 except that the amount of the platinum contained in the first layer (innermost layer) of the cathode catalyst layer was adjusted to 0.2 mg/cm² (1/3 of the total amount of the platinum contained), and that the amount of the platinum contained in the second layer (outermost layer) of the same was adjusted to 0.4 mg/cm² (2/3 of the total amount of the platinum contained).

COMPARATIVE EXAMPLE 7

A catalyst-coated membrane, a membrane-electrode assembly and a unit cell were produced in the same manner as in EXAMPLE 1 except that the amount of the platinum carried in the first layer (innermost layer) of the cathode catalyst layer was adjusted to 2/5 of the total amount of the platinum in the cathode catalyst layer.

[Evaluation Test]

Each of the unit cells produced in EXAMPLEs 1 to 11 and COMPARATIVE EXAMPLEs 1 to 7 was controlled to be 70° C. Then, a hydrogen gas as the fuel gas was supplied to the anode-side gas flow path, and air was supplied to the cathode-side gas flow path. The hydrogen gas and air were humidified and heated in advance so as to have a dew point of about 70° C. while setting a hydrogen gas utilization rate and an air utilization rate to 70% and 40%, respectively. Each unit cell was then operated for 12 hours under condition of a current density of 0.3 mA·cm⁻² to be aged.

(1) Initial Cell Output Characteristics Evaluation Test

In order to evaluate the initial cell output characteristics, each unit cell was operated in the same conditions as aging described above except that the current density was changed to 0.2 mA·cm⁻² and 0.7 mA·cm⁻². Then, the output voltage after 30 minutes from the start of the operation was recorded.

From the standpoint of the energy conversion efficiency of a fuel cell stack, each unit cell is required to have an output voltage of not less than 750 mV when operated at a current density of 0.2 mA·cm⁻² and an output voltage of not less than 650 mV when operated at a current density of 0.7 mA·cm⁻². The reason that the above output voltages are required is as follows. Because the average of the energy conversion efficiencies of all the thermal power plants in Japan is about 30 to 35%, fuel cell power generation systems including stationary fuel cell cogeneration systems and automotive fuel cell power generation systems are also required to have energy conversion efficiencies of the same level, that is, about 30 to 35%. In order to achieve such energy conversion efficiency in a fuel cell stack, each unit cell is required to have an output voltage of not less than 750 mV when operated at a current density of 0.2 mA·cm⁻² and an output voltage of not less than 650 mV when operated at a current density of 0.7 mA·cm⁻².

For this reason, the recorded output voltages were evaluated. The unit cell which satisfied the both requirements was rated as "1" (acceptable). The unit cell which satisfied only one requirement or no was rated as "2" (unacceptable). The results are shown in Table 1. When the above requirements are not satisfied, the hydrogen ion conductivity might decrease, or the flooding due to product water might proceed, resulting in a decrease in the efficiency and durability. Parenthetically, the ratios ($W_P/W_{Cat-C}$) of the inner layer and the outer layer are also shown in Table 1.

(2) Durability Evaluation Test

Each unit cell was subjected to the standard durability test, in which the unit cell was operated under conditions similar to the actual operation, and the accelerated durability test, in which the degradation of the membrane-electrode assembly was accelerated so as to obtain the service life in a short time.

In the standard durability test, each unit cell was operated in the same conditions as aging described above except that the current density was changed to 0.16 mA·cm⁻², and that a mixed gas containing hydrogen and carbon dioxide at a volume ratio of 8:2 was supplied to the anode-side gas flow path and air was supplied to the cathode-side gas flow path.

In the accelerated durability test, each unit cell was operated in the same conditions as aging described above except that the unit cell was operated under open-circuit condition where no current was allowed to flow, and that a mixed gas containing hydrogen and carbon dioxide at a volume ratio of 8:2 was supplied to the anode-side gas flow path and air was supplied to the cathode-side gas flow path.

In the open-circuit condition, because water is not produced as a result of cell reaction, hydrogen peroxide that causes the degradation due to decomposition remains in the battery system for a long time. At the same time, the quenching of the radicals generated from hydrogen peroxide by produced water cannot be expected. Accordingly, it is presumed that the degradation due to decomposition of the polymer electrolyte membrane is accelerated.

In view of the above, the amount of fluoride ions released by the degradation due to decomposition in the accelerated durability test was measured by chromatography. The total amount of fluoride ions released from the start of the operation to 500 hours after the start was then calculated. From the standpoint of the durability of fuel cells, the total amount of fluoride ions released is preferably not greater than 8.0 mg. The unit cell having a total amount of fluoride ions released of not greater than 8.0 mg was rated as "1" (acceptable). The unit cell having a total amount of fluoride ions released of over 8.0 mg was rated as "2" (unacceptable). The results are shown in Table 1. When the total amount of fluoride ions released is more than 8.0 mg, it is impossible to obtain highly efficient cell output for a long period of time.

The reason for rating the unit cell having a total mount of fluoride ions released of not greater than 8.0 mg as acceptable is because the present inventors confirmed that, the fuel cells whose cell output ΔE did not decrease almost at all (0 to 10 mV) when they were operated at a current density of 0.16 mA·cm⁻² had a total amount of fluoride ions released of not greater than 8.0 mg (see Wen Liu et al., J. New Mater. Electrochem. Syst., 4 (2001) 227).

Note that the unit cells of COMPARATIVE EXAMPLEs 4 and 7 were not subjected to the durability test because they were determined to be unacceptable in terms of the initial cell output characteristics.

TABLE 1

| | Ratio ($W_P/W_{Cat-C}$) | | Initial cell output characteristics | | | Durability characteristics | | Note |
|---|---|---|---|---|---|---|---|---|
| | Innermost layer | Outermost layer | 0.2 mAcm$^{-2}$ | 0.7 mAcm$^{-2}$ | Evaluation | Amount of fluoride ions released (mg) | Evaluation | |
| Ex. 1 | 1.0 | 0.4 | 775 | 670 | 1 | 6.0 | 1 | |
| Ex. 2 | 1.0 | 0.4 | 770 | 655 | 1 | 6.2 | 1 | 3 layers |
| Ex. 3 | 0.8 | 0.4 | 770 | 670 | 1 | 7.0 | 1 | |
| Ex. 4 | 1.5 | 0.4 | 770 | 670 | 1 | 6.0 | 1 | |
| Ex. 5 | 3.0 | 0.4 | 765 | 650 | 1 | 6.0 | 1 | |
| Ex. 6 | 1.0 | 0.2 | 770 | 655 | 1 | 6.0 | 1 | |
| Ex. 7 | 1.0 | 0.3 | 775 | 660 | 1 | 6.0 | 1 | |
| Ex. 8 | 1.0 | 0.5 | 775 | 665 | 1 | 6.0 | 1 | |
| Ex. 9 | 1.0 | 0.6 | 775 | 655 | 1 | 6.0 | 1 | |
| Ex. 10 | 1.0 | 0.4 | 775 | 660 | 1 | 8.0 | 1 | Innermost layer Pt 1/10 |
| Ex. 11 | 1.0 | 0.4 | 775 | 660 | 1 | 6.0 | 1 | Innermost layer Pt 1/3 |
| Comp. Ex. 1 | 0.4 | 0.4 | 775 | 670 | 1 | 11.5 | 2 | Monolayer |
| Comp. Ex. 2 | (1.0) | (0.4) | 770 | 655 | 1 | 10.0 | 2 | Anode 2 layers |
| Comp. Ex. 3 | 0.8 | 0.4 | 770 | 670 | 1 | 10.0 | 2 | |
| Comp. Ex. 4 | 3.5 | 0.4 | 760 | 590 | 2 | — | — | |
| Comp. Ex. 5 | 1.0 | 0.15 | 740 | 630 | 2 | — | — | |
| Comp. Ex. 6 | 1.0 | 0.7 | 775 | 580 | 2 | — | — | |
| Comp. Ex. 7 | 1.0 | 0.4 | 775 | 320 | 2 | — | — | Innermost layer Pt 2/5 |

As is evident from the results shown in TABLE 1, the membrane-electrode assemblies of EXAMPLEs 1 to 11 exhibited high efficiency and long life operation.

As described above, the polymer electrolyte fuel cell of the present invention is expected to be useful for mobile units such as automobiles, distributed power generation systems and home cogeneration systems.

The invention claimed is:

1. A catalyst-coated membrane comprising a hydrogen ion conductive polymer electrolyte membrane, a cathode catalyst layer and an anode catalyst layer sandwiching said polymer electrolyte membrane, said cathode catalyst layer and said anode catalyst layer each comprising: a catalyst-carrying carbon comprising a carbon powder and an electrode catalyst carried on said carbon powder; and a hydrogen ion conductive polymer electrolyte attached to said catalyst-carrying carbon, wherein at least said cathode catalyst layer comprises at least two layers, the ratio ($WP/W_{Cat-C}$) of the weight of said polymer electrolyte ($W_P$) to the weight of said catalyst-carrying carbon ($W_{Cat-C}$) is decreased from an innermost layer positioned closest to said polymer electrolyte membrane toward an outermost layer positioned farthest from said polymer electrolyte membrane in said cathode catalyst layer, and said ratio ($W_P/W_{Cat-C}$) in said innermost layer is 0.8 to 3.0 and said ratio ($W_P/W_{Cat-C}$) in said outermost layer is 0.2 to 0.6, the ratio ($W_{Cat-innermost}/W_{Cat-total}$) of the weight of said electrode catalyst contained in said innermost layer ($W_{Cat-innermost}$) to the weight of said electrode catalyst contained in said entire cathode catalyst layer ($W_{Cat-total}$) is 1/10 to 1/3.

2. The catalyst-coated membrane in accordance with claim 1, wherein the ratio ($W_P/W_{Cat-C}$) of the weight of said polymer electrolyte ($W_P$) to the weight of said catalyst-carrying carbon ($W_{Cat-C}$) is decreased from an innermost layer positioned closest to said polymer electrolyte membrane toward an outermost layer positioned farthest from said polymer electrolyte membrane in only said cathode catalyst layer, and said ratio ($W_P/W_{Cat-C}$) in said innermost layer is 0.8 to 3.0 and said ratio ($W_P/W_{Cat-C}$) in said outermost layer is 0.2 to 0.6.

3. The catalyst-coated membrane in accordance with claim 1, wherein the catalyst-carrying ratio of said catalyst-carrying carbon is 20 to 80 wt %.

4. A membrane-electrode assembly comprising the catalyst-coated membrane in accordance with claim 1, a cathode gas diffusion layer formed on the outer surface of said cathode catalyst layer and an anode gas diffusion layer formed on the outer surface of said anode catalyst layer.

5. A polymer electrolyte fuel cell comprising the membrane-electrode assembly in accordance with claim 4.

* * * * *